Nov. 17, 1931.  W. H. SERGENT  1,831,826
CANDY FORMING MACHINE
Filed Sept. 28, 1928    7 Sheets-Sheet 1

Inventor:
Walter H. Sergent.
by: Charles Feller
Attys.

Nov. 17, 1931.   W. H. SERGENT   1,831,826
CANDY FORMING MACHINE
Filed Sept. 28, 1928   7 Sheets-Sheet 4

Inventor:
Walter H. Sergent.
by: Charles [signature] Attys

Nov. 17, 1931. W. H. SERGENT 1,831,826
CANDY FORMING MACHINE
Filed Sept. 28, 1928 7 Sheets-Sheet 5

Inventor:
Walter H. Sergent.
by:

Nov. 17, 1931.    W. H. SERGENT    1,831,826
CANDY FORMING MACHINE
Filed Sept. 28, 1928    7 Sheets-Sheet 6

Inventor:
Walter H. Sergent.
by: Charles W. Hills
Atty

Nov. 17, 1931.  W. H. SERGENT  1,831,826
CANDY FORMING MACHINE
Filed Sept. 28, 1928   7 Sheets-Sheet 7

Patented Nov. 17, 1931

1,831,826

UNITED STATES PATENT OFFICE

WALTER H. SERGENT, OF MIDDLETOWN, NEW YORK, ASSIGNOR TO IDEAL WRAPPING MACHINE COMPANY, OF MIDDLETOWN, NEW YORK, A CORPORATION OF NEW YORK

CANDY FORMING MACHINE

Application filed September 28, 1928. Serial No. 309,044.

This invention relates to a machine and method of manufacturing candy and concerns itself with a method for forming a sheet of candy dough, slitting the sheet into strips and separating the strips preferably in different vertical planes, producing a staggered relation so that the same will not stick or adhere to each other and advancing the strips in separated relation, realigning them in the same plane and shearing the same into pieces for transferal to an enrober belt for coating the same. The invention further embodies a machine or apparatus for carrying out the method.

The invention comprises the novel method and structure hereinafter described and more particularly pointed out and defined in the appended claims.

In the accompanying drawings I will illustrate a preferred embodiment of this invention and in which similar reference numerals refer to similar features in the different views.

On the drawings.

As shown on the drawings.

Referring now to the drawings which illustrate one embodiment of this invention. It will be observed that the machine is supported upon a suitable frame consisting of supporting legs 1 and upper side members 2, which carry bearings for parts of the machine.

Figure 1:
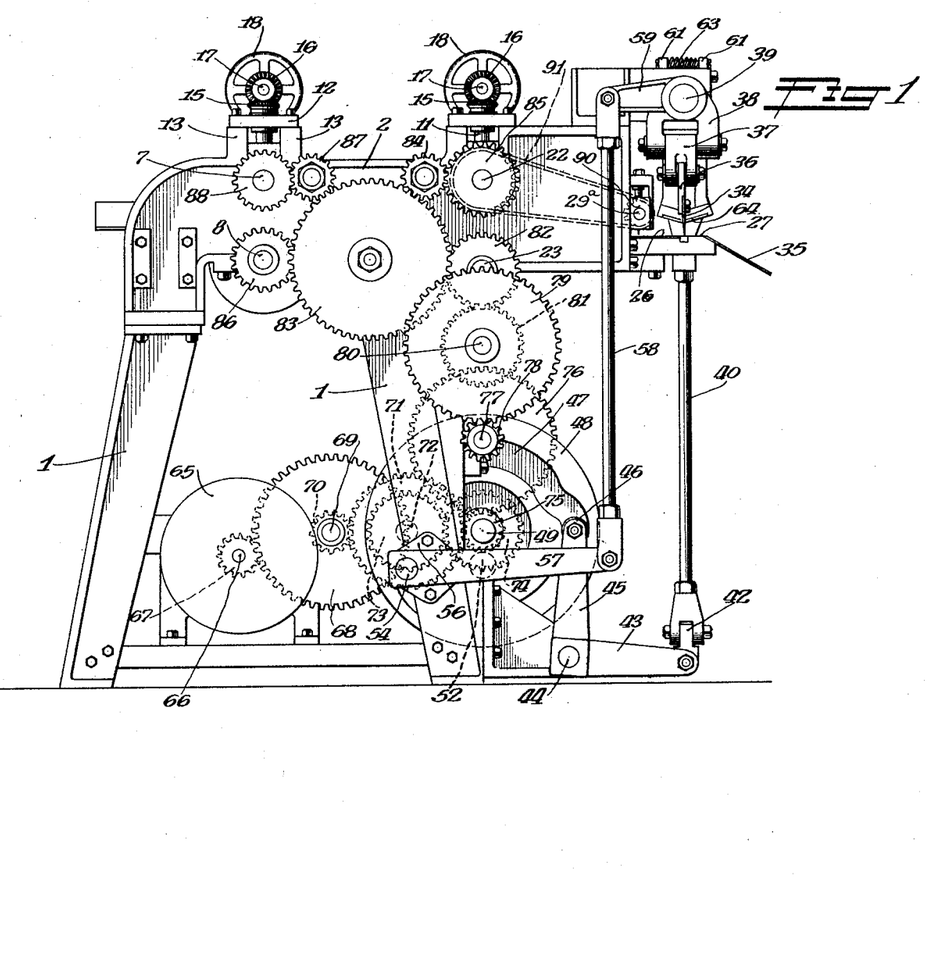
Figure 1 is a side elevational view of the apparatus involving this invention.

The side members 2 are connected by transverse beams 3 (Figure 2) which support a feed table or platform 4. In connection with the feed table 4, are a pair of sizing rolls 5 and 6 which are respectively mounted upon shafts 7 and 8, which are journalled in bearings in the side members 2. It will be noted that the bearings for the shaft 7 consist of bearing blocks 9 which are slidable in bearing boxes formed in the side members 2. Each bearing block 9 is connected with a screw 11. Each screw 11 extends through a cap piece 12 bolted to spaced projections 13 upon the side members 2 as shown in Figure 1. Beneath each cap piece 12 there is a collar 14 upon the screw shafts 11 and above the cap piece 12 each screw 11 is provided with a pinion 15 which meshes with a pinion 16 upon a transverse shaft 17 journalled in the bearing caps 12. The shaft 17 is provided with a hand wheel 18 upon one end whereby the same may be rotated for raising or lowering the bearing blocks 9, together with the roller for adjusting the pass between the two rolls.

The roller 6 has a longitudinally corrugated periphery and side flanges 19 which overlap the ends of the roller 5. The rollers 5 and 6 are normally spaced apart to provide a closed pass through which the candy dough is forced and from which the candy dough merges in the form of a sheet. The sheet of candy that is formed by the sizing rolls 5 and 6, passes between the strip forming rolls 20 and 21 which are respectively mounted upon shafts 22 and 23. The ends of the shafts 22 and 23 are journalled in suitable bearings carried by the side members 2 and the bearing blocks 9a for the shaft 22, are adjustable by means of screws 11, pinions 15 and 16, and a transverse hand rotated shaft 17 in the same way as the blocks 9 for the shaft 7 in order that the strip that passes between the rolls 20 and 21 may be varied.

Figure 4:
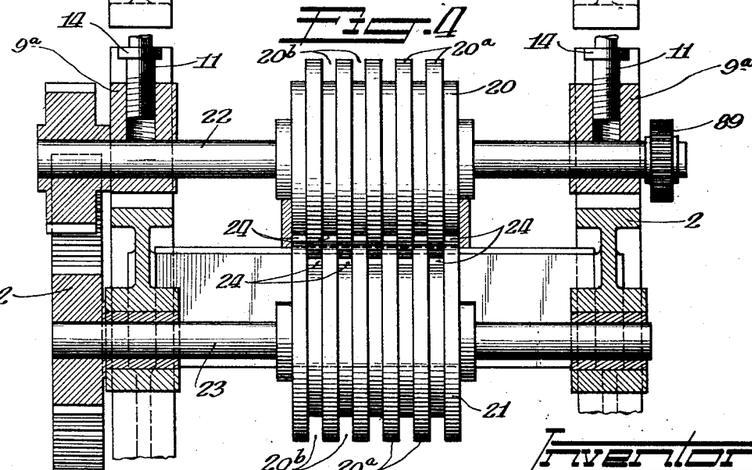
Figure 4 is an enlarged sectional view taken upon the line IV—IV of Figure 2, looking in the direction of the arrow.

Referring to Figure 4, it will be noted that each of the rolls 20 and 21 consist of annular ridges or rings 20a with intermediate grooves 20b. The rings or ridges of one roll fit in the annular grooves of the other roll whereby a series of staggered passes 24 are formed between the roll. It will be noted that the sides of the ridges or rings 20a are perpendicular to the axis of the rolls. Consequently, as a sheet passes between the rolls the same will be sheared into strips as these rings enter the grooves of the opposite rolls. On account of the staggered relation of these passes the strips will be separated in vertical planes. In other words, they will have a staggered relation avoiding thereby any possibility of their sticking together and causing a mess. If desirable, the bottom of the grooves in the roll 21 may be serrated or corrugated in order to more thoroughly advance the strips as shown in Figure 2.

Figure 5:
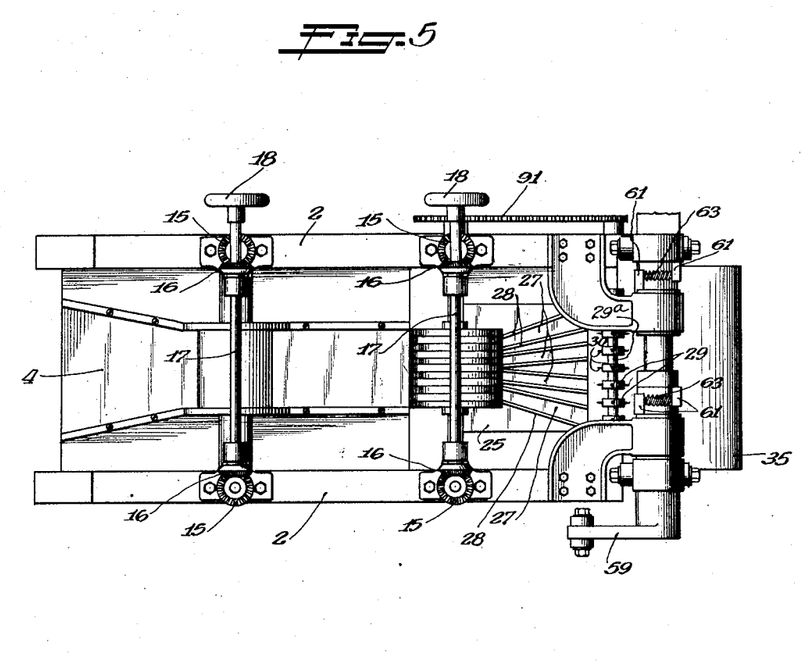
Figure 5 is a top plan view of the machine.

The strips of candy dough are separately carried from each pass and realigned in the same horizontal plane for shearing purposes. To this end there is a platform 25 (Figure 2) which leads from the upper series of passes 24 and a platform 26 which leads from the lower series of passes. Each platform is divided into diverging guideways 27 (Figure 5.) The guideways are formed by suitable upright strips 28 upon the platforms.

Figure 6:
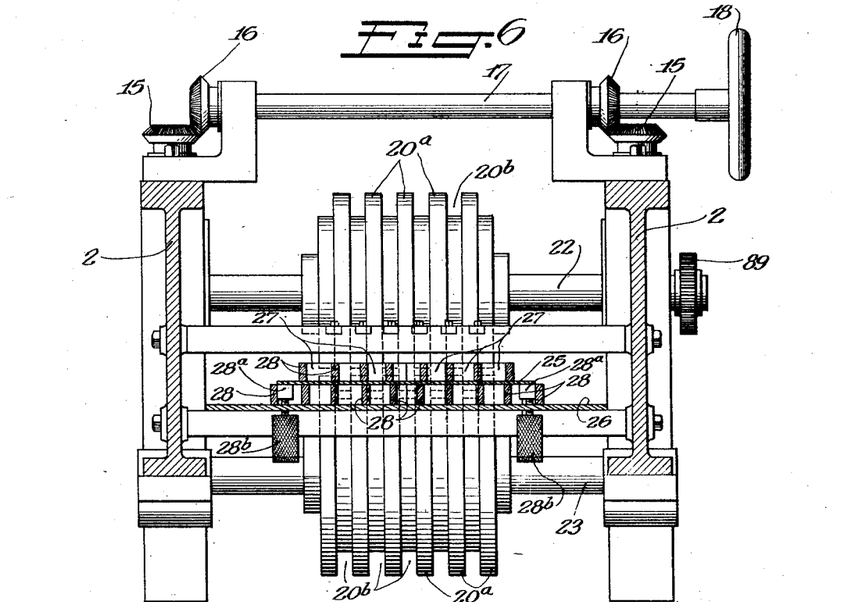
Figure 6 is an enlarged sectional view taken upon the line VI—VI of Figure 2.

In referring to Figure 6, it will be noted that mechanism has been provided for removably supporting the platform 25. To this end, lugs 28a are secured to the platform 25 and suitable screws 28b extending through the lower platform 26 are threaded in the lugs 28a. Obviously, by unscrewing the screws 28b the platform 25 may be removed.

Figure 2:
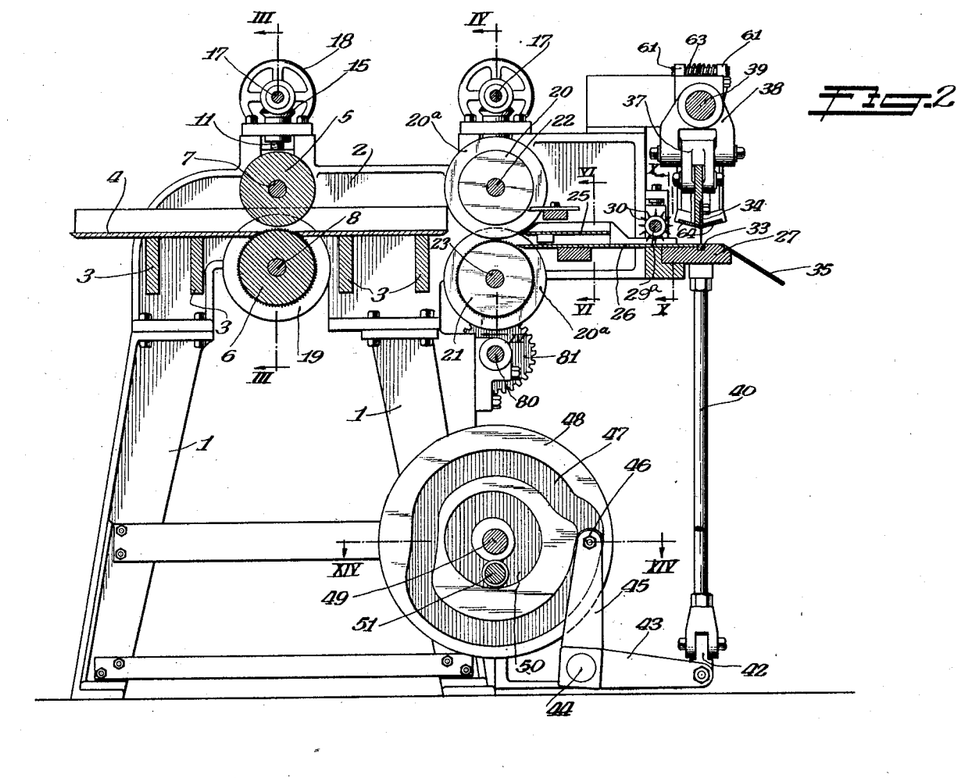
Figure 2 is a central longitudinal section through the machine.
Figure 3:
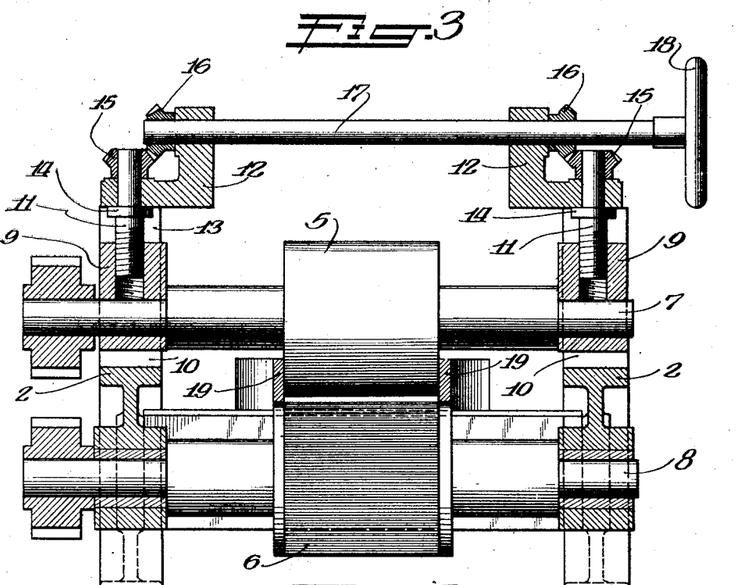
Figure 3 is an enlarged sectional view taken upon the line III—III of Figure 2, looking in the direction of the arrow.
Figure 9:
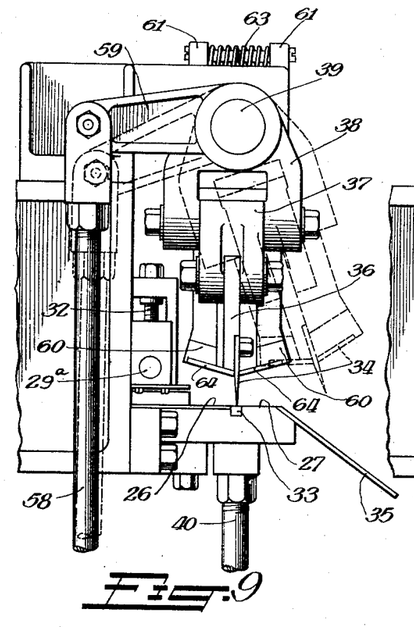
Figure 9 is a view similar to Figure 8, showing the swingable features of the shears in dotted lines.
Figure 10:
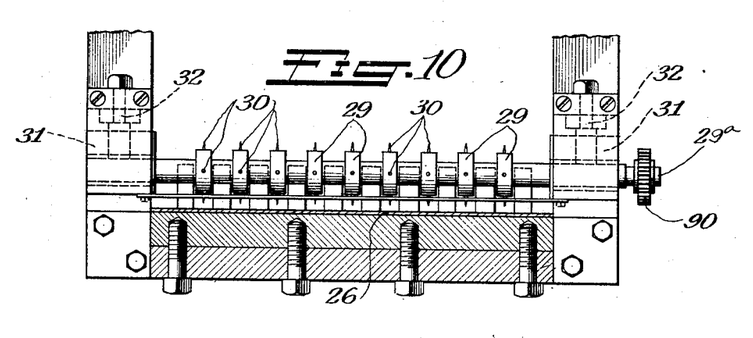
Figure 10 is an enlarged sectional view taken upon the line X—X of Figure 2.
Figure 11:
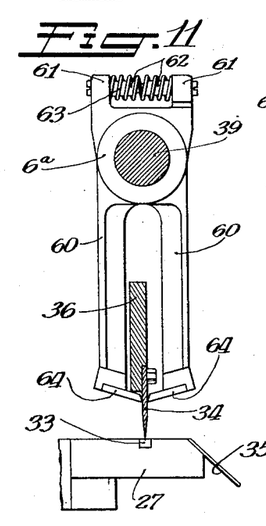
Figure 11 is an enlarged sectional view taken upon the line XI—XI of Figure 7, looking in the direction of the arrow.
Figure 12:
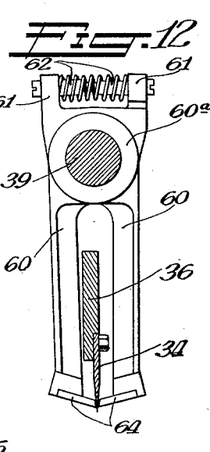
Figure 12 is a view similar to Figure 11, showing the parts in a different position.
Figure 13:
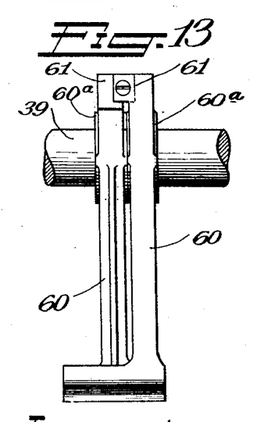
Figure 13 is a side elevational view of the structure shown in Figure 12.

In referring to Figure 2, it will be noted that the platform 25 ends at a suitable distance from the strip forming rolls and that the platform 26 continues to a shearing platform 27. Consequently, the strips will drop down upon the platform 26 when they reach the end of the platform 25. Spaced a short distance from the end of the platform 25 and just above the platform 26, there is a shaft 28 upon which a plurality of spaced collars 29 are secured. Each collar 29 is provided with a plurality of sharp pins or projections 30 which are adapted for piercing the strips and advancing the same. It will be noted that the collars 29 are sufficiently spaced from the platform 26 to allow the strips to pass thereunder. The shaft 29a is journalled in slidable bearing blocks 31 which are controlled by adjustable screws 32, whereby the strip advancing shaft 29a may be raised and lowered according to the thickness of the strips that are being rolled. Extending lengthwise of the shearing platform, there is a fiber inset 33 for coaction with a shears 34 mounted directly above the inset. The shearing plate 34 is adapted for vertical reciprocating movements, and also for swinging movements as shown in dotted lines in Figure 9, for discharging the cut pieces from the shearing platform.

Figure 7:
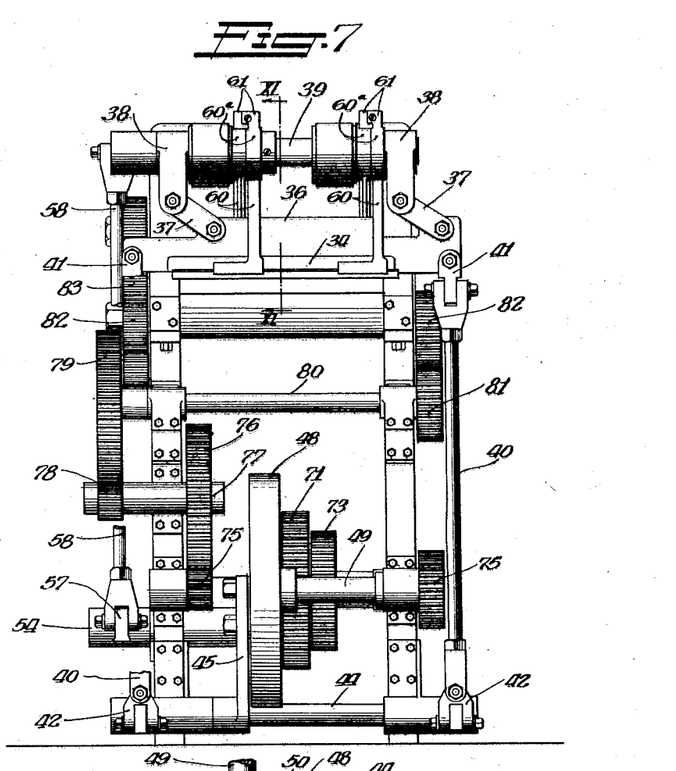
Figure 7 is a front elevational view of the machine.
Figure 8:
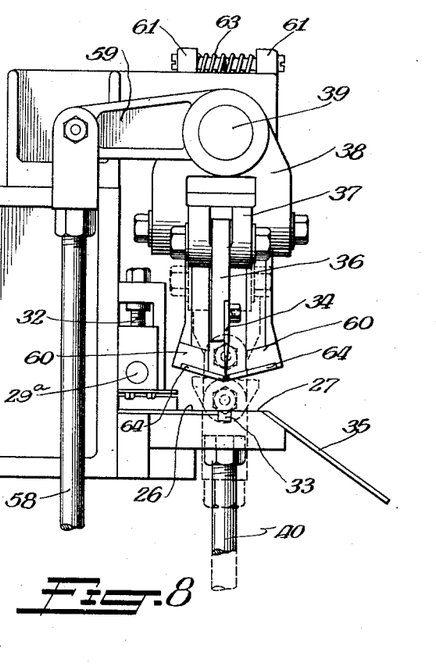
Figure 8 is an enlarged fragmentary elevational view of the shearing mechanism.

The sheared pieces will descend the chute 35 below which there is an enrobing belt, not shown, for coating the cut pieces. The shearing plate 34 is secured to a plate-like support 36 best shown in Figure 7. The support 36 is connected by a pair of parallel links 37 to crank arms 38, secured upon a shaft 39 which is journalled in a suitable support at the top of the frame. The shears 34 is reciprocated by a pair of rods 40 which are pivoted at their upper end to lugs 41 pivoted to the shear support 36. The lower ends of the rods 40 are pivoted to lugs 42 which are in turn pivoted to levers 43 (Figure 2) which are attached to a shaft 44 which is suitably journalled in bearings attached to the legs of the machine. An arm 45 is secured to the shaft 44. The upper end of the arm 45 is provided with a roller 46 which travels in a cam groove 47 of a cam 48 secured upon a shaft 49 which is suitably journalled upon the framework of the machine. Suitable mechanism has been provided as will later be set forth for rotating the cam 48 and oscillating the shaft 44. The oscillation of the shaft 44 will raise and lower the rods 40 for reciprocating the shears 34. Referring to Figure 2, it will be noted that the cam groove 47 is so constructed that the shears will be slightly raised after each actuation thereof so as to be clear of the shear blocks when the same are swung for discharging the cut pieces.

Figure 14:
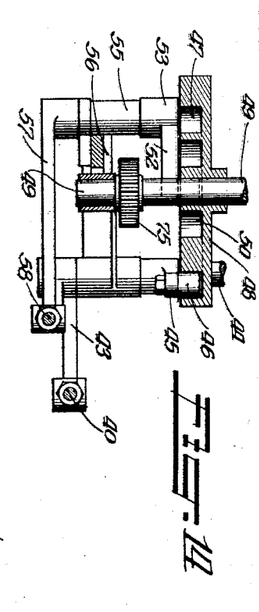
Figure 14 is a sectional view taken upon the line XIV—XIV of Figure 2.

The interior portion of the cam 48 is provided with an eccentric groove 50 in which a stud 51 operates. The stud 51 is secured to the end of a lever 52 (Figure 14), having a hub 53 which is secured upon a shaft 54 (Figure 1). The shaft 54 is journalled in a sleeve bearing 55 upon the end of a bracket 56 secured to one of the legs of the framework. Upon the end of the shaft there is secured a lever 57 to which a reciprocating rod 58 is pivoted. The upper end of the rod 58 is pivoted to an arm 59 secured to the aforementioned shaft 39, whereby the reciprocation of the shaft 58 will rock the shaft 39 and swing the shears 34, as shown in dotted lines in Figure 9, for discharging the pieces of candy that have been sheared from the strips.

Means are provided for scraping the shears 34 during their swinging movements. To this end two pairs of arms 60 are loosely journalled upon the shaft 39 through the instrumentality of hubs 60a. Each hub 60a has an upstanding lug 61 and these lugs face each other. Each lug is provided with a spring retaining stud 62 upon which a coil spring 63 is mounted. Each pair of the arms 60 carry swiping plates 64 at their lower ends. It will be noted that these swiping plates engage the sides of the shearing blade 34; being pressed resiliently against such sides by the expansion of the coil springs 63. It will be noted that the shearing blade 34 passes between the swiping plates 64 during its reciprocating movements by the rods 40.

The various operating elements of the machine are driven from a single source of power which is shown in the present instance, as a motor 65 (Figure 1), having a shaft 66 provided with a small pinion 67 which is geared to a large spur gear 68 secured upon a shaft 69. A small spur gear 70 is secured upon the shaft 69 and the same meshes with a larger spur gear 71 secured upon a shaft 72. Upon the shaft 72 there is a medium sized spur gear 73 which meshes with a gear 74 secured upon the cam shaft 49 which makes one revolution for each piece of candy that is cut off. A small pinion 75 is secured upon the shaft 49 and meshes with a large spur gear 76 secured upon a shaft 77. The small pinion 78 upon the shaft 77 drives a gear 79 secured upon a shaft 80. Upon the shaft 80 there is a gear 81 which meshes with a gear 82 secured upon the shaft 23 of the lower strip forming rolls. Upon the opposite end of the shaft 23 there is a second gear 82 which operates idler gear 83, which in turn, drives an idler pinion 84 that meshes with and drives a gear 85 secured upon the shaft 22 of the upper strip forming roll. The aforementioned idler pinion 83 also drives a pinion 86 upon the shaft 8 of the lower sizing roll and the idler gear 83 also meshes and drives an idler pinion 87, which in turn, meshes with and drives a gear 88 upon the shaft 7 of the upper sizing roll.

Upon the shaft 22 of the upper strip forming rolls, there is a sprocket gear 89. Upon the shaft 28 of the pin wheels 29, there is a sprocket gear 90. The sprocket gears 89 and 90 are connected by a sprocket chain 91, whereby the pin wheels are driven for advancing the strips.

It will be noted that the apparatus heretofore described is capable of forming a batch of candy dough into a sheet and then shearing said sheet into suitable strips having a staggered relation; that is, separated from each other in different planes so as not to adhere to each other, then advancing the strips and aligning them in the same horizontal plane and then simultaneously shearing the strips into suitable pieces of candy and discharging the same down the chute 35. An enrobing belt, not shown, is adapted to receive the pieces of candy for dipping or coating purposes. It should, however, be understood that this particular method may be readily carried out in a different kind of apparatus than the one disclosed in the specification.

I am aware that many changes may be made, and numerous details of construction may be varied through a wide range without departing from the principles of this invention, and I therefore do not purpose limiting the patent granted hereon otherwise than necessitated by the prior art.

I claim as my invention:

1. In a candy forming mechanism, means for forming a sheet of candy, means for longitudinally severing said sheet in staggered relation, means for realining the strips in the same plane, a reciprocable shears for transversely shearing said alined strips means for reciprocating said shears, and means for swinging said shears in an arc for discharging the sheared pieces.

2. In a candy forming machine, sizing rolls for forming a sheet of candy, a pair of rolls having a plurality of passes in different horizontal planes for forming the sheet into strips and separating the strips in vertical planes, guiding means for the separated strips, a reciprocable shears for cutting suitable pieces from said strips, means for reciprocating said shears and means for swinging said shears for discharging the pieces.

3. In a candy forming machine, a pair of sizing rolls for forming a sheet of candy, coacting rolls having passes at different elevations for shearing said sheet into strips, a guide platform extending from each elevation, a common platform for receiving the strips from said guide platforms, and means for shearing said strips on said common platform.

4. In a candy forming machine, a pair of sizing rolls for forming a sheet of candy, a pair of rolls having staggered passes for forming said sheet into separate strips, guides extending from said passes for conveying said strips in separated relation, a reciprocable shears for shearing said strips, means for supporting said shears for swinging movements, and means for swinging said shears.

5. In a machine for forming candy, a pair of sizing rolls for forming a sheet of candy, a pair of rolls having mutually interfitting parts for shearing said sheet into strips and simultaneously separating alternate strips in different horizontal planes, a guiding platform in alignment with each plane, the upper platform being shorter than the lower platform whereby the strips upon the upper platform simultaneously descend upon the lower platform, a shearing platform, means for advancing said strips upon the shearing platform, a reciprocable shears for transversely shearing said strips, means for reciprocating said shears a pivotal support for said shears, and means for swinging said shears laterally for discharging the sheared pieces.

6. In a candy forming machine a pair of sizing rolls for forming a sheet of candy, a pair of rolls having alternate grooves and ridges for shearing said sheet into strips and separating alternate strips in different planes, means for advancing said strips and realigning the same in the same horizontal plane, a shaft, a support secured upon said shaft, a shears connected to said support for reciprocating movement, means for lowering said shears for a shearing operation and then partially elevating the same, and means for rocking said shaft after such partial elevation of said shears to swing the same for discharging the sheared pieces.

7. In a candy forming machine for forming a sheet of candy, mechanism for slitting said sheet into strips and separating alternate strips into different planes, guiding mechanism for separately advancing said strips, a shearing platform, means for advancing said strips upon said shearing platform, a vertically reciprocable shears above said platform, a pivotal support for said shears, a cam, and a connection between said cam and shears for lowering the same for a shearing operation and partially elevating the same, and a connection between said cam and shears for swinging the latter after such partial elevation of the same.

8. In a candy forming machine, mechanism for forming strips of candy, a shearing platform, means for advancing said strips into separated relation upon said shearing platform, a shaft above said platform, arms secured to said shaft, a shearing element, links connecting said shearing element and arms, a cam connection between said cam and shearing element for lowering the same for a shearing operation and partially elevating the same, and a connection between said cam and shaft for rocking the same after such partial elevation.

9. In a candy forming machine, a pair of sizing rolls for forming a sheet of candy, a pair of coacting rolls so constructed as to shear said sheet into longitudinal strips and separate said strips in different vertical planes, a guiding platform extending from each plane for separately guiding said strips, a shearing platform, means for advancing said strips upon said shearing platform, a reciprocable shears for coaction with said platform for transversely shearing said strips and means for swinging said shears for discharging said strips.

10. In a candy forming machine, mechanism for forming strips of candy, a reciprocable shears, wiping elements in engagement with said shears, means for reciprocating said shears relative to said wiping elements, and means for swinging said shears in an arc while the same projects beyond said wiping elements for discharging the sheared pieces.

11. In a candy forming machine, mechanism for forming a sheet of candy, mechanism for forming said sheet into strips, and mechanism for shearing said strips into pieces and discharging the same, comprising a reciprocable shearing element, wiping elements in engagement with the sides of said shearing element, a pivotal support for said shearing element, means for reciprocating said shears below said wiping elements, and then swinging the same for discharging the cut pieces.

12. In a candy forming machine, mechanism for forming strips of candy, mechanism for shearing said strips, comprising a shearing element, wiping elements yieldingly acting upon the sides of said shearing element, means for reciprocating said shearing element relative to said wiping elements, and means for swinging said shearing element in an arc when the same is below said wiping elements for discharging the sheared pieces.

13. In a candy forming machine, mechanism for forming the candy into strips and a shearing element for shearing said strips, mechanism for advancing said shearing element for a cutting operation and partially retracting the same, and means for swinging said shearing element in its retracted position for discharging the sheared pieces.

14. In a candy forming machine, a pivotal support, a shears mounted upon said support for reciprocating and swinging movement, driving mechanism for reciprocating said shears in one direction and partially retracting the same, and means for swinging the shears after such partial retraction.

15. In a candy forming machine, a pair of co-acting rolls having staggered passes for forming strips of candy, a shearing platform, guiding means extending from each pass for directing said strips to said shearing platform, a reciprocable and swingable shears above said platform and means for reciprocating and swinging said shears for shearing and discharging the cut pieces.

16. In a candy forming machine, mechanism for forming a sheet of candy, mechanism for slitting said sheet into slits and advancing the same, a reciprocable shears for transversely shearing said strips, a pivotal support for said shears, means for reciprocating said shears and means for rocking said support for swinging said shears for discharging the severed pieces.

In testimony whereof I have hereunto subscribed my name at Middletown, Orange County, New York.

WALTER H. SERGENT.